United States Patent
Jackson

[15] 3,667,512
[45] June 6, 1972

[54] POWDER SAMPLER
[72] Inventor: Meryl R. Jackson, Schaumburg, Ill.
[73] Assignee: Freeman Laboratories, Inc., Rosemont, Ill.
[22] Filed: Oct. 21, 1970
[21] Appl. No.: 82,686

[52] U.S. Cl. ............................. 141/130, 141/102, 141/131
[51] Int. Cl. ......................................................... B65b 43/50
[58] Field of Search ............................... 141/130–134, 256, 141/183–191, 267, 268, 102; 73/421, 424

[56] References Cited

FOREIGN PATENTS OR APPLICATIONS 819,974  11/1951  Germany ............................... 141/132

Primary Examiner—Houston S. Bell, Jr.
Attorney—E. Manning Giles, J. Patrick Cagney, Michael A. Kondzella and Richard A. Zachar

[57] ABSTRACT

A sampling device for obtaining representative samples of material from a bulk quantity thereof includes a plurality of rotating sample containers which are sequentially and repetitively fed by a flow stream of the material. The flow stream eminates from a hopper. The mechanism controls the flow rate of the flow stream to insure representativeness and statistical validity of the samples.

7 Claims, 2 Drawing Figures

PATENTED JUN 6 1972  3,667,512

INVENTOR
MERYL R. JACKSON
BY Richard A. Zachar
ATTORNEY 3,667,512

POWDER SAMPLER

BACKGROUND OF THE INVENTION

The present invention relates to sampling devices for obtaining representative samples of material from a bulk quantity of material.

Particulate materials used in a process often at some time or another must be withdrawn from a larger mass of material. The sample withdrawn may be used in the actual process or may be used for analysis as a control. Wherever it is assumed that the sample is the same, or representative of the bulk material, that sample must be obtained in a statistically valid manner.

It is difficult to obtain a representative sample of material from a bulk quantity of a mixture of particles in a fluid. If the mixture is freely flowing like dry sand in air, the large particles tend to separate from the small ones and locate at one or more boundaries within the mixture. In the case of cohesive materials, like cornstarch or viscous pastes, it is difficult to cause the material to flow so that sampling from the entire mixture is impossible.

Many techniques have been proposed and are being used for sampling powders and suspensions. In the simplest technique a sample of powder or suspension is removed from the exposed surface of the bulk material, using a scoop or similar receiver. This method gives samples which have been taken from the outer areas of the material and are thus liable to be non-representative of the bulk. The technique is used extensively since it is rapid and inexpensive, but it is unsuitable for freely flowing powder since these roll off the scoop.

Another method involves the insertion of a sample tube or thief into the body of the mixture to be sampled. A concentric door may be opened and closed to obtain a sample from a particular location and then allow the thief to be withdrawn with the sample inside. This technique is used extensively in boxcar and other bulk sampling but has an extremely low efficiency. Samples are representative of only the location sampled and do not necessarily relate to the composition of the bulk. Highly cohesive powders tend to remain outside the thief when the door is opened and do not flow into the sample cavity.

In another technique, called "cone and quartering," the bulk material is allowed to form into a heap or cone. A large knife-like blade is inserted vertically into the cone to divide it into two mirror-image fractions. One fraction is removed and the blade then inserted vertically into the remaining fraction to divide it into two mirror-image fractions. One of these is then discarded to leave a quarter of a cone having approximately one quarter the volume of the original bulk sample. This technique reduces errors arising as a consequence of segregation of material, but theoretically relies on there being a cone having perfect symmetry about its vertical axis. In practice, this is not achieved and therefore the method is subject to error. In addition, the technique is relatively slow, requires manual effort, invites sample contamination and tends to introduce dusting with consequent loss of fine material.

Yet another technique involves the use of a table having an inclined slotted surface. Material sliding down the incline is split into two fractions by guides. One half is discarded down a slot while the other half slides to a second set of guides and is subdivided into two parts again. Three stages of division are usually provided on a table. This technique is poor and gives samples having a wide range of composition. Efficiency is determined by the method of filling and is hence "operator dependant."

Still another technique involves the use of apparatus consisting of a V-shaped trough containing ten or more shoots feeding, alternately, two trays placed on either side of the trough. Efficiency of sampling is dependant, when using this technique upon the number of shoots, their size relative to the size of the largest particle in the mixture, the method of filling the trough and the exact geometry of the system. The method is capable of dividing the sample by two, only, and is generally inefficient in giving representative samples of small volumes of mixtures. In a somewhat similar approach, material is held in a hopper and allowed to freely flow through the throat of the hopper and into a plurality of rotating trays. Highly cohesive powders and viscous pastes tend to choke the shoots (or throat of the hooper) and do not flow freely and freely flowing materials tend to be subject to boundary formation.

A need therefore exists for a means of obtaining a representative sample of material from a larger batch or bulk of the material which means can be used both in the case of extremely freely flowing materials or highly cohesive materials, the sample being statistically valid and identical in composition to the original batch.

SUMMARY OF THE INVENTION

In satisfying this need, the sampling device of the present invention makes use of a receiver that is subdivided into a plurality of radially oriented sample containers. A hopper-like container or funnel is supported above the receiver and holds the bulk material to be sampled. The container has a bottom outlet opening or throat in communication with a metering system which operates to cause material flow at a substantially time-uniform rate from the container into the sample compartments of the receiver, which is caused to be rotated.

In the preferred embodiment illustrated herein, the metering means comprises an auger screw coaxially mounted within an auger tube. By varying the clearance between the auger tube and the auger screw, all types of wet and dry mixtures can be representatively sampled on a statistically valid basis.

Other features and advantages of the invention will be apparent from the following description and claims and are illustrated in the accompanying drawings which show structure embodying preferred features of the present invention and the principles thereof, and what is now considered to be the best mode in which to apply these principles.

DETAILED DESCRIPTION OF THE PREFERRED EMBODIMENT

Figure 2:
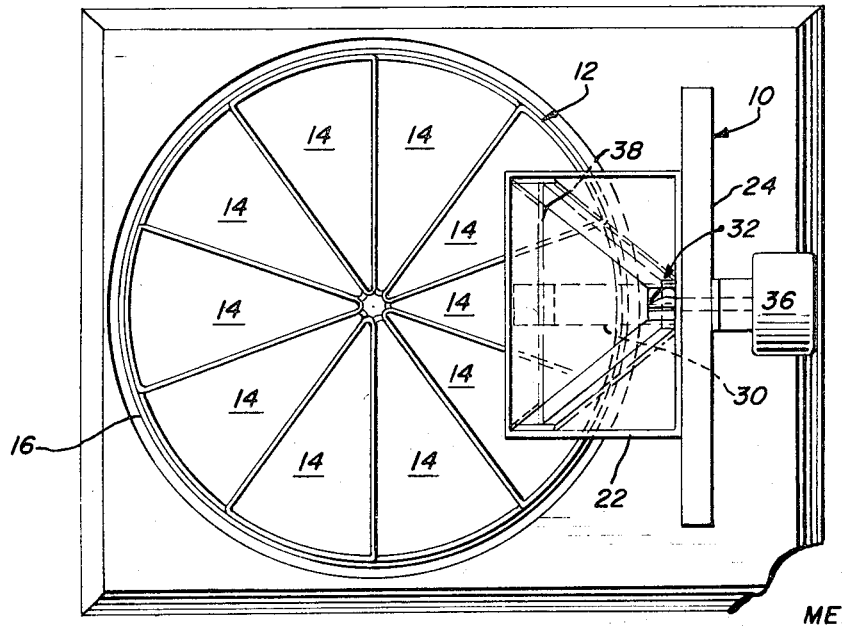
FIG. 2 is a top plan view of the sampler device showing the sample containers of the receiver.

With reference now to the drawings, a sampling device 10 in accordance with the present invention is shown to comprise a mixture receiver 12 that is subdivided into a plurality of sample containers 14 and which is rotatably supported on a rotating table 16 that is driven through a shaft 18 by a motor 20. The bulk material or mixture to be sampled is contained within a supply hopper or funnel 22 which is supported by suitable support structure 24 in elevated relation to the receiver 12. A flow-rate control mechanism 26 is fed with the bulk material and operates to transport at a substantially time-uniform rate the material from the throat 32 of the supply hopper 22 horizontally to a discharge position 34 above the receiver 12. As illustrated in FIG. 2, the sample containers are pie-segment in shape and are disposed, when the receiver is placed on the rotary table 16, such that the material exiting from the flow rate control mechanism 26 falls sequentially into each sample container as it passes under the outlet 34. The speed of rotation of the receiver 12 is selected to minimize loss of fine powders by windage, but rapid enough, as will be explained more fully below, so that each sample container 14 is presented to the material flow stream a sufficient number of times, preferably at least 30 times, to insure statistical validity.

As suggested above, the function of the flow rate control mechanism 26 is to insure that the containers 14 receive representative samples of the material flow and to insure, through control of the flow rate, that the containers sample the flow stream a sufficient number of times to provide statistically valid samples regardless of the flow characteristics of the bulk material or mixture to be sampled. Since the quality of the stream material is variable with time, in order to obtain a representative sample in each of the containers 14, the sample collected in each cup must comprise a number of small samples collected at a number of points in time. In this way the variability of the stream is averaged out. In this connection it will be noted that since the speed of rotation of receiver 12 is finite, the stream flow rate must also be finite if each container 14 is to be presented to the stream a number of times. Thus, the material in the hopper 22 should not be emptied in a time period comparable to or less than the time for rotation of table 16. If this were to occur the sample containers 14 would contain a mixture whose quality would be determined by the characteristic of the stream as a function of time. Thus, the flow rate control device 26 is provided to ensure that the material is discharged from the hopper over a time period corresponding to at least 30 rotations of the table 16.

In the presently preferred embodiment, the flow rate control mechanism comprises an auger assembly that includes a horizontal tube 30 having a material receiving opening 32' communicating with the bulk quantity through the hopper throat 32 and a material discharge opening 34'' communicating with the sample containers 14. A screw 28 which extends between the spaced openings 32' and 34' and is rotatively driven by a suitable motor 36 completes the auger and operates to transport material upon its rotation from opening 32' to opening 34'. When the bulk material is wet or has high cohesive properties, the auger screw 28 should have an outer diameter substantially equal to the inner diameter of the auger tube so as to eliminate the tendency of cohesive materials and pastes to cake onto the inner surface of the auger tube. In the case of bulk materials consisting of relatively large particles, a clearance should be maintained between the auger screw and the auger tube to prevent crushing the particles. Proper clearance between the auger screw and tube can be accomplished either by changing the auger screw itself or by inserting a suitable sleeve (not shown) into the auger tube to reduce the effective inner diameter thereof.

The pitch, diameter and speed of rotation of the screw are selected to provide a predetermined rate of delivery and, hence, the assembly 26 may be considered to be a metering device. In the embodiment illustrated herein for use in laboratory testing, a rotation rate of 25 rpm for a 1 inch diameter screw having a pitch between one-half to 1 inch has produced excellent results for both wet and dry materials.

Figure 1:
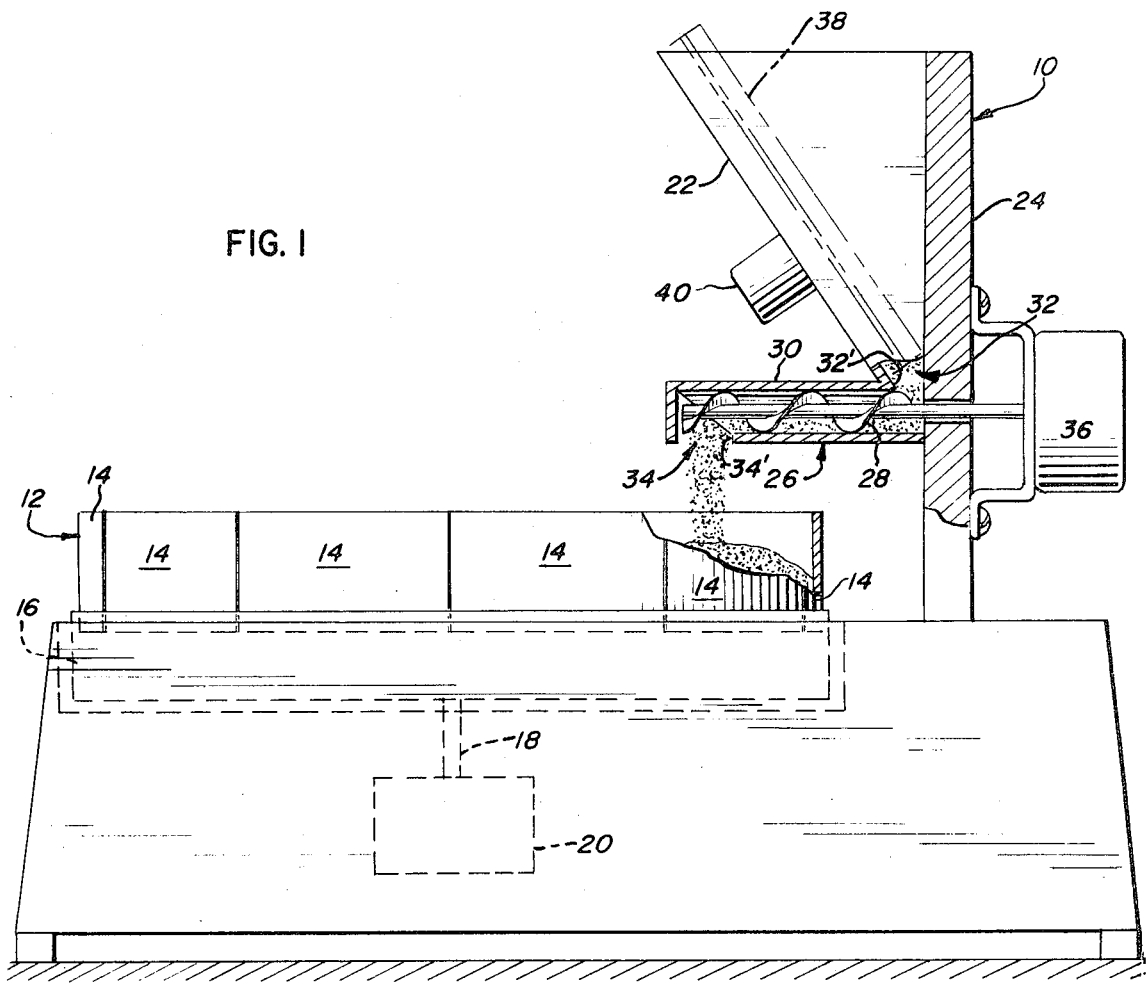
FIG. 1 is a side elevational view, partly in section, showing a preferred form of the sampler device of the present invention.

The storage hopper 22 is provided with an electromagnet or other type of vibrator 40 which moves the walls or one wall of the hopper near its throat. This action breaks arches formed in cohesive powders and helps maintain a flow of powder from the hopper to the feeder 26. To further regulate the flow rate of freely flowing mixtures and to thereby maintain the statistical validity of sampling by insuring that the containers are presented a sufficient number of times to the flowing stream of mixture, the throat 32 of the supply hopper 22 can be varied in size. Thus, for example, a removable "false wall" 38 is illustrated in phantom in FIG. 1 for this purpose.

While preferred constructional features of the invention are embodied in the structure illustrated herein, it is to be understood that changes and variations may be made by those skilled in the art without departing from the spirit and scope of the appended claims.

What is claimed is:

1. A sampling device for obtaining representative samples of material from a bulk quantity thereof and including first means for funneling the bulk quantity to produce a material flow stream, a plurality of sample containers, second means for sequentially and repetitively moving said sample containers individually into intercepting relation with said flow stream whereby said sample containers each intermittently receives material which is only a portion of a sample from the bulk quantity so that a sample is built up in each of said sample containers over a period of time after repetitive movement of said sample containers into said intercepting relation with said flow stream, said device being characterized in that said first means includes mechanism for effecting a substantially time-uniform and continuous flow rate of said flow stream.

2. A sampling device in accordance with claim 1 wherein the effected flow rate relative to the repetition rate of said sample containers is such that each of said sample containers moves through intercepting relation with said flow stream at least approximately 30 times prior to exhaustion of the bulk quantity.

3. A sampling device in accordance with claim 1 wherein said mechanism includes an elongated tube having spaced material receiving and discharge openings, a screw rotatively mounted coaxially within said tube, and means for axially rotating said screw for producing axial flow of material from the receiving opening to the discharge opening.

4. A sampling device in accordance with claim 3 wherein the diameter of said tube, the pitch of said screw and the speed of rotation of said screw are such as to produce an axial flow rate relative to the repetition rate of said sample containers such that each of said sample containers moves through intercepting relation with said flow stream at least approximately 30 times prior to exhaustion of the bulk quantity.

5. A sampling device for obtaining representative samples of material from a bulk quantity thereof and including first means for funneling the bulk quantity to produce a material flow stream, a plurality of sample containers, second means for sequentially and repetitively moving said sample containers individually into intercepting relation with said flow stream whereby said sample containers each intermittently receives material which is only a portion of a sample from the bulk quantity so that a sample is built up in each of said sample containers over a period of time after repetitive movement of said sample containers into said intercepting relation with said flow stream, said device being characterized in that said first means includes mechanism for effecting a substantially time-uniform and continuous flow rate of said flow stream regardless of the natural flow characteristic of the material of the bulk quantity to be sampled, said mechanism including a tube having a material receiving opening in communication with the funneled bulk quantity and a material discharge opening in communication with said sample containers, and a screw rotatively mounted within said tube and extending between the openings for axially transporting upon rotation thereof material from said material receiving opening to said material discharge opening.

6. A sampling device in accordance with claim 5 wherein the diameter of said screw and the inner diameter of said tube each is approximately 1 inch, said screw having a pitch between about one-half to 1 inch and a rotation rate of about 25 rpm.

7. A sampling device in accordance with claim 5 and further including means for varying the effective size of said material receiving opening in accordance with the flow characteristic of the material.

* * * * *